US011119614B2

(12) United States Patent
Yoshida

(10) Patent No.: US 11,119,614 B2
(45) Date of Patent: Sep. 14, 2021

(54) DISPLAY PANEL

(71) Applicant: SHARP KABUSHIKI KAISHA, Sakai (JP)

(72) Inventor: Masahiro Yoshida, Sakai (JP)

(73) Assignee: SHARP KABUSHIKI KAISHA, Sakai (JP)

(*) Notice: Subject to any disclaimer, the term of this patent is extended or adjusted under 35 U.S.C. 154(b) by 0 days.

(21) Appl. No.: 16/632,723

(22) PCT Filed: Jul. 19, 2018

(86) PCT No.: PCT/JP2018/027029
§ 371 (c)(1),
(2) Date: Jan. 21, 2020

(87) PCT Pub. No.: WO2019/021924
PCT Pub. Date: Jan. 31, 2019

(65) Prior Publication Data
US 2021/0132426 A1 May 6, 2021

(30) Foreign Application Priority Data
Jul. 26, 2017 (JP) .............................. JP2017-144284

(51) Int. Cl.
*G02F 1/1333* (2006.01)
*G06F 3/044* (2006.01)
*G02F 1/1362* (2006.01)

(52) U.S. Cl.
CPC ........ *G06F 3/0443* (2019.05); *G02F 1/13338* (2013.01); *G02F 1/136286* (2013.01); *G06F 3/0446* (2019.05)

(58) Field of Classification Search
CPC .................................................. G02F 1/13338
See application file for complete search history.

(56) References Cited

U.S. PATENT DOCUMENTS

| 2011/0057887 A1* | 3/2011 | Lin ....................... G06F 3/0443 |
| | | 345/173 |
| 2014/0152613 A1* | 6/2014 | Ishizaki ............ G02F 1/134336 |
| | | 345/174 |
| 2016/0224155 A1* | 8/2016 | Kim ...................... G09G 3/3688 |

(Continued)

FOREIGN PATENT DOCUMENTS

WO 2016/136272 A1 9/2016

*Primary Examiner* — Sang V Nguyen
(74) *Attorney, Agent, or Firm* — ScienBiziP, P.C.

(57) ABSTRACT

A display panel includes a glass substrate divided into a display region and a non-display region surrounding the display region, a plurality of pixel electrodes disposed in the display region, a plurality of position detection electrodes disposed in the display region and configured to detect an input position by a position input body, the plurality of position detection electrodes constituting a common electrode disposed overlapping the plurality of pixel electrode, a first position detection line disposed in the display region and connected to a position detection electrode of the plurality of position detection electrode, and a second position detection line disposed in a layer different from a layer of the first position detection line in the display region and overlapping the first position detection line, the second position detection line being electrically connected to the first position detection line at at least two locations.

9 Claims, 11 Drawing Sheets

(56) References Cited

U.S. PATENT DOCUMENTS

2016/0253024 A1* 9/2016 Aoyama .............. G09G 3/3648
                                                               345/174
2018/0081470 A1* 3/2018 Li ........................ G06F 3/0412

* cited by examiner

DISPLAY PANEL

TECHNICAL FIELD

The disclosure relates to a display panel.

BACKGROUND ART

In the related art, a display panel described in PTL 1 below has been known as an example of a display panel with an image display function and a touch panel function. The display panel described in PTL 1 includes a common electrode configured to function as a position detection electrode (sensor electrode) configured to detect a touch position, and the common electrode and a position detection line (sensor electrode line) are connected. The sensor electrode line is disposed in the same layer as that of the data signal line.

CITATION LIST

Patent Literature

PTL 1: WO 2016/136272

Technical Problem

In the above-described configuration, in a case that the position detection line has a great electrical resistance, the detection accuracy of the touch position may decrease, and luminance unevenness will occur. Note that such a situation is likely to occur at a position detection electrode located far from a driver (at a location where the entire length of the position detection line is long). To reduce the electrical resistance of the position detection line, it is conceivable that the width of the position detection line is increased. However, in a case that the width of the position detection line is increased, an aperture ratio decreases.

SUMMARY

The disclosure has been completed on the basis of the circumstances described above, and an object of the disclosure is to reduce the electrical resistance of a position detection line connected to a position detection electrode while securing an aperture ratio.

Solution to Problem

To solve the above problem, a display panel of an aspect of the disclosure includes a substrate divided into a display region configured to allow an image to be displayed and a non-display region surrounding the display region, a plurality of pixel electrodes disposed in the display region, a plurality of position detection electrodes disposed in the display region and configured to detect an input position by a position input body, the plurality of position detection electrodes constituting a common electrode disposed overlapping the plurality of pixel electrodes, a first position detection line disposed in the display region and connected to a position detection electrode of the plurality of position detection electrodes, and a second position detection line disposed in a layer different from a layer of the first position detection line in the display region and overlapping the first position detection line, the second position detection line being electrically connected to the first position detection line at at least two locations. Since the first position detection line and the second position detection line are electrically connected at at least two locations, the electrical resistance of the position detection line connected to the position detection electrode can be reduced. Since the second position detection line is disposed overlapping the first position detection line, an aperture ratio can be secured.

Advantageous Effects of Invention

According to the disclosure, it is possible to reduce the electrical resistance of a position detection line connected to a position detection electrode while securing an aperture ratio.

DESCRIPTION OF EMBODIMENTS

First Embodiment

The first embodiment of the disclosure will be described with reference to FIGS. 1 to 9. In the present embodiment, a liquid crystal panel 10 (display panel) having a touch panel function (position input function) in addition to a display function is exemplified. Note that the X axis, the Y axis, and the Z axis are illustrated in a part of each drawing, and each axial direction is illustrated to be the direction illustrated in each drawing. Furthermore, a vertical direction is based on the vertical direction of FIG. 1, an upper side of the same drawing is referred to as a froth side, and a lower side of the same drawing is referred to as a back side. The liquid crystal panel 10 is configured to display an image using illumination light emitted from a backlight device (illumination device) (not illustrated).

Figure 1:
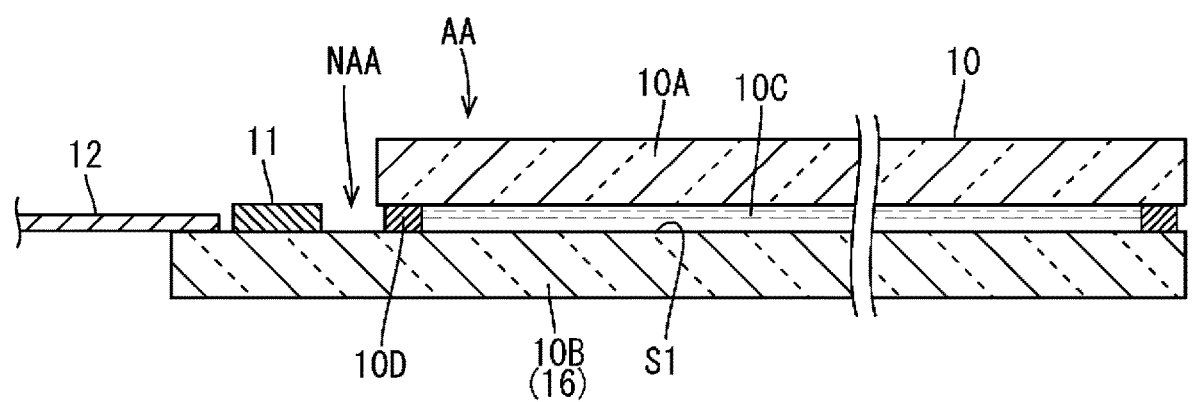
FIG. 1 is a cross-sectional view schematically illustrating a liquid crystal panel according to a first embodiment of the disclosure.
Figure 1:
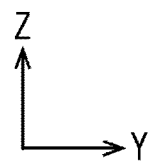

As illustrated in FIG. 1, the liquid crystal panel 10 includes at least a pair of glass substrates 10A and 10B, a liquid crystal layer 10C, and a sealing member 10D. The glass substrates are almost transparent and have excellent light-transmitting properties. The liquid crystal layer 10C is disposed in an internal space S1 between plate surfaces of both the substrates 10A and 10B facing to each other and includes liquid crystal molecules, optical characteristics of which change depending on an applied electrical field. The front side (front surface side) substrate of the pair of substrates 10A and 10B constituting the liquid crystal panel 10 is a CF substrate 10A (counter substrate), and a back side (back surface side) substrate thereof is an array substrate 10B (wiring substrate, active matrix substrate). The CF substrate 10A and the array substrate 10B are each formed by layering various films on the inner surface of the glass substrate.

Figure 2:
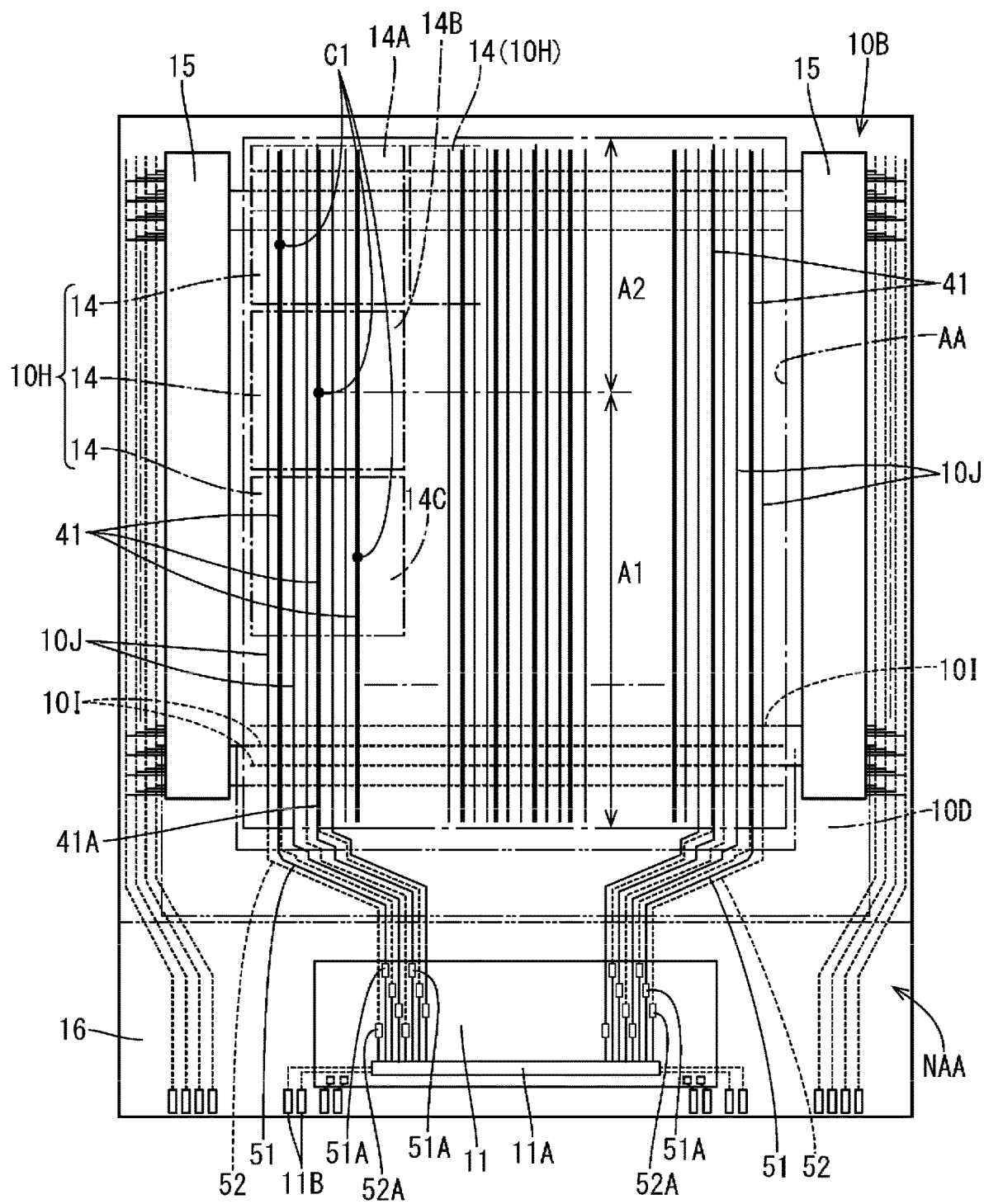
FIG. 2 is a plan view schematically illustrating a line configuration of an array substrate constituting a liquid crystal panel.

The CF substrate 10A is disposed facing the array substrate 10B with the liquid crystal layer 10C interposed therebetween. The scaling member 10D is formed from a photocurable resin material such as an ultraviolet-curing resin material, for example. The sealing member 10D has a rectangular frame shape, is disposed surrounding the internal space S1 between the array substrate 10B and the CF substrate 10A, and seals the liquid crystal layer 10C. Note that polarizing plates (not illustrated) are attached to the outer surfaces of both the substrates 10A and 10B, respectively. In FIG. 2, a portion of the sealing member 10D is illustrated with a two-dot chain line.

The liquid crystal panel 10 (furthermore, the array substrate 10B and a glass substrate 16) is divided into a display region AA where an image can be displayed and a non-display region NAA where an image is not displayed. As illustrated in FIG. 2 with the dot-dash line, the display region AA has a rectangular shape and is disposed in the center portion of the liquid crystal panel 10. The non-display region NAA is a frame-shaped outer peripheral portion surrounding the display region AA. As illustrated in FIG. 1, a portion of the array substrate 10B protrudes laterally with respect to the CF substrate 10A, and a driver 11 and a flexible substrate 12 are mounted on the protruding portion (non-display region NAA) as components configured to supply various signals related to the display function and the touch panel function. One end portion of the flexible substrate 12 is connected to the array substrate 10B, and the other end portion thereof is connected to a control substrate (not illustrated). Various signals supplied from the control substrate are transmitted to the liquid crystal panel 10 via the flexible substrate 12 and outputted to the display region AA after processed by the driver 11 in the non-display region NAA.

Figure 3:
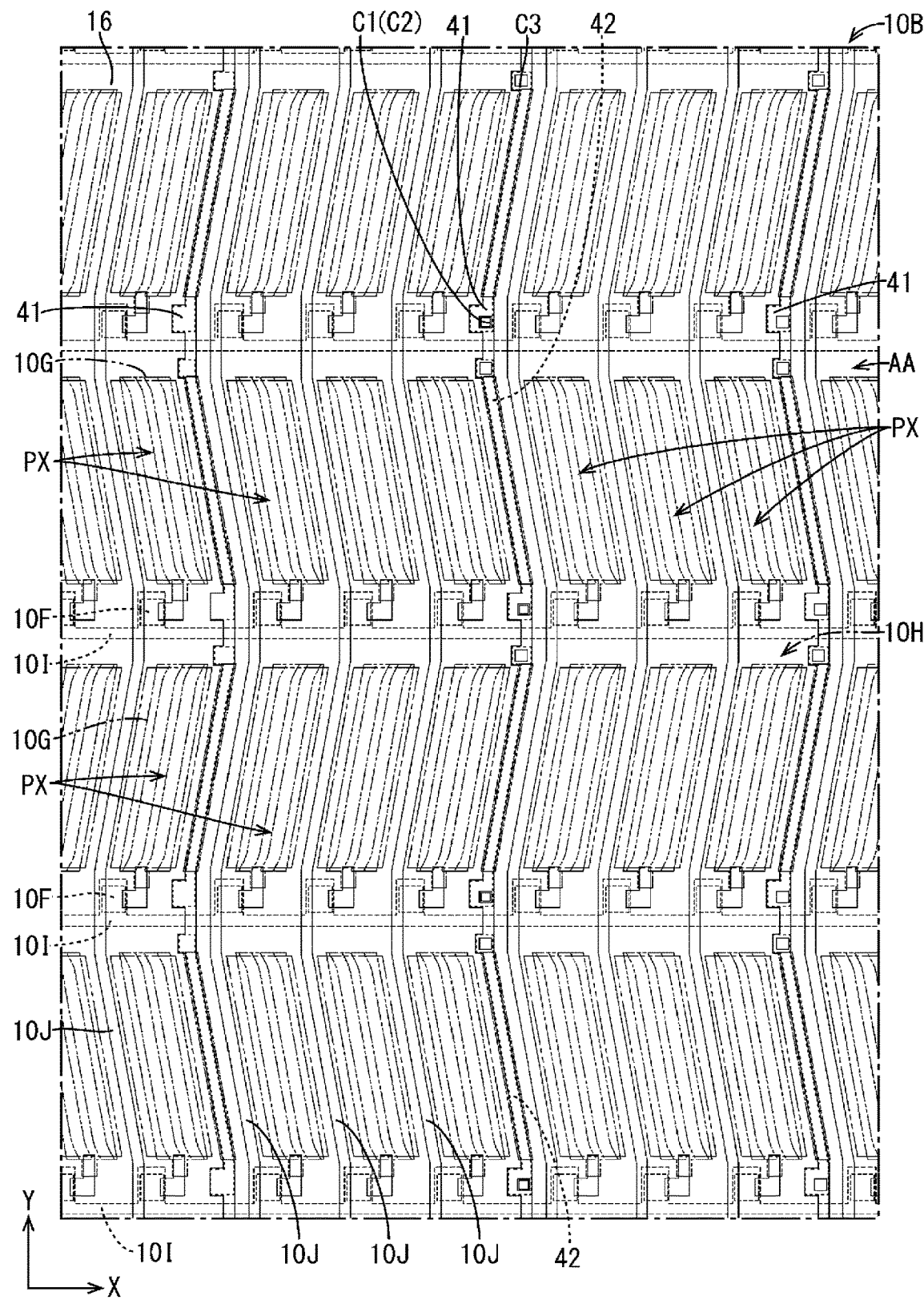
FIG. 3 is a plan view illustrating a pixel arrangement of an array substrate.
Figure 4:
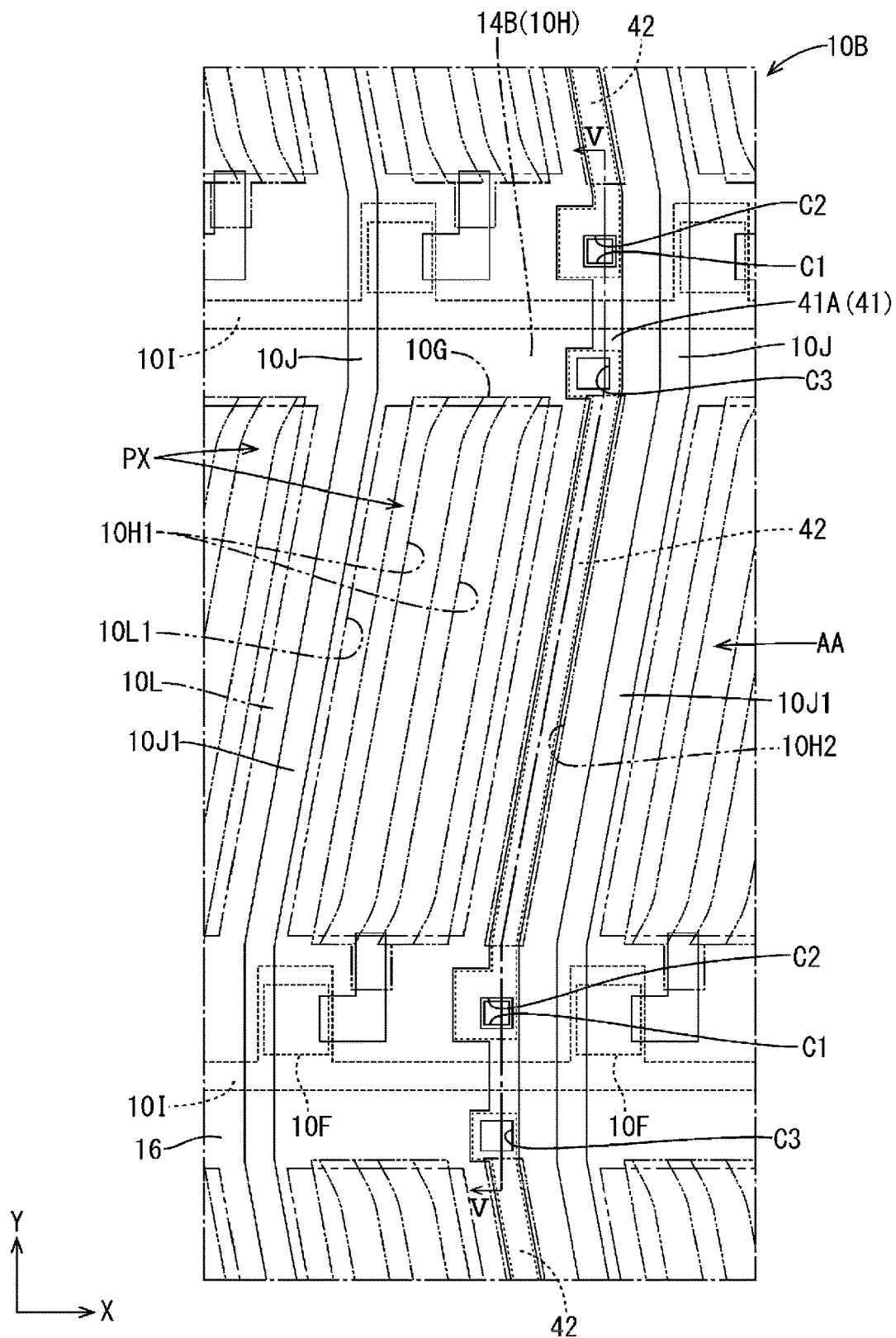
FIG. 4 is a plan view illustrating a pixel disposed at a location where a position detection electrode 14B is disposed.

As illustrated in FIGS. 3 and 4, a plurality of sets of TFT 10F and pixel electrode 10G are disposed side-by-side along the X-axis direction and the Y-axis direction in a matrix-shaped manner in the display region AA on the inner surface of the glass substrate 16 constituting the array substrate 10B. A gate line 10I and a source line 10J, which are formed in a substantially lattice-shaped manner, are disposed around and surround the TFT 10F and the pixel electrode 10G. While the gate line 10I extends almost straight along the X-axis direction, the source line 10J extends mostly along the Y-axis direction, and a portion thereof extends along an inclined direction with respect to the Y-axis direction. The gate line 10I is connected to a gate electrode of the TFT 10F, and the source line 10J is connected to a source electrode of the TFT 10F. The pixel electrode 10G is connected to a drain electrode of the TFT 10F. In other words, the source line 10J (pixel line) is connected to the pixel electrode 10G with the TFT 10F interposed therebetween. Note that examples of the material of a semiconductor film constituting the TFT 10F include amorphous silicon and In—Ga—Zn—O based semiconductor (indium gallium zinc oxide); however, no such limitation is intended. Note that "the pixel line connected to the pixel electrode 10G" means that the pixel line includes a pixel line connected to the pixel electrode 10G with the TFT 10F interposed therebetween.

The TFT 10F is driven on the basis of various signals respectively supplied to the gate line 10I and the source line 10J, and as with the driving of the TFT 10F, the supply of electrical potential to the pixel electrode 10G is controlled. The planar shape of the pixel electrode 10G is a substantially vertically long parallelogram. The source line 10J is interposed between the pixel electrodes 10G adjacent to each other in the X-axis direction, and the gate line 10I is interposed between the pixel electrodes 10G adjacent to each other in the Y-axis direction. Additionally, color filters of three colors (not illustrated) that exhibit red (R), green (g), and blue (b) are provided on the CF substrate 10A. In the liquid crystal panel 10, a pixel portion PX is configured by one pixel electrode 10G and a color filter of one color facing to each other. In other words, the liquid crystal panel 10 includes pixel portions PX of three colors corresponding to the color filters of three colors.

A common electrode 10H is formed overlapping all of the pixel electrodes 10G at the glass substrate 16. The common electrode 10H is disposed in an upper layer (the front side in FIG. 4) than the pixel electrode 10G. Note that, in FIGS. 3 and 4, basically, components formed in a front side layer of a layer in which the source line 10J is formed are indicated by a two-dot chain line, and components formed in a back side layer of the layer in which the source line 10J is formed are indicated by a dashed line. The common electrode 10H is configured to be supplied with a constant reference potential and extends across almost the entire display region AA. The common electrode 10H includes a plurality of pixel overlapping openings 10H1 formed for each portion overlapping the pixel electrode 10G. The pixel overlapping opening 10H1 extends along an inclined extending portion 10J1 of the source line 10J.

In a case that the pixel electrode 10G is charged, and thus, a potential difference is generated between the pixel electrode 10G and the common electrode 10H overlapping with each other, a fringe electrical field (oblique electrical field) including a component in the normal direction to the plate surface of the array substrate 10B, in addition to a component along the plate surface of the array substrate 10B, is generated between an opening edge of the pixel overlapping opening 10H1 and the pixel electrode 10G. The alignment state of the liquid crystal molecules included in the liquid crystal layer 10C can be controlled using the fringe electrical field. In other words, the liquid crystal panel 10 according to the present embodiment has an operation mode of a Fringe Field Switching (FFS) mode. In FIG. 4, a light blocking portion 10L formed in the display region AA on the inner surface of the CF substrate 10A is indicated by a two-dot chain line. The light blocking portion 10L has a substantially lattice shape and includes a pixel opening 10L1 configured to allow light to pass therethough at a position overlapping a large portion of the pixel electrode 10G. The light blocking portion 10L has a function to prevent color mixing generated between the pixel portions PX that exhibit different colors. The pixel electrode 10G and the common electrode 10H are formed from a transparent electrode material (e.g., Indium Tin Oxide (ITO), indium Zinc Oxide (IZO), and the like).

The liquid crystal panel 10 according to the present embodiment has a display function for displaying an image and a touch panel function (position input function) for detecting a position (input position) input by a user on the basis of the displayed image. For the touch panel function, a touch panel pattern configured to exhibit the touch panel function is integrated into the liquid crystal panel 10 (forming an in-cell touch panel). The touch panel pattern is used to form a so-called projected capacitive type touch panel, and the detection type thereof is a self-capacitance type. As illustrated in FIG. 2, the touch panel pattern is configured by a plurality of position detection electrodes 14 disposed side-by-side in a matrix-shaped manner in the plate surface of the glass substrate 16. The position detection electrodes 14 are disposed in the display region AA. In a case that a user of the liquid crystal panel 10 brings a finger (position input body) (not illustrated) that is an electrical conductor close to the surface (display surface) of the liquid crystal panel 10, electrostatic capacitance is formed between the finger and the position detection electrode 14. Accordingly, electrostatic capacitance detected by the position detection electrode 14 near the finger changes as the finger is brought close to the surface, and the electrostatic capacitance is different from that of the position detection electrode 14 away from the finger, and this difference makes it possible to detect an input position by the finger. The common electrode 10H described above is configured by a plurality of position detection electrodes 14.

The gate drivers 15 connected to the respective gate lines 10I are provided on the both end portions in the X-axis direction of the glass substrate 16 constituting the array substrate 10B, respectively. The gate driver 15 has a shape long in the Y-axis direction and is formed in a monolithic manner on the glass substrate 16, for example. Note that, in the present embodiment, one gate line 10I is connected to any one of the pair of gate drivers 15 and 15, and the gate lines 10I are configured such that a gate line 10I connected to a left gate driver 15 in FIG. 2 and a gate line 10I connected to a right gate driver 15 in FIG. 2 are arranged in an alternative manner in the Y-axis direction.

As illustrated in FIGS. 2 and 3, a first position detection line 41 extending in the Y-axis direction is connected to the position detection electrode 14 with a contact hole C1 interposed therebetween (see FIG. 2). As illustrated in FIG. 2, the first position detection line 41 extends along the entire length in the Y-axis direction (one side direction) of the display region AA, and as illustrated in FIG. 3, is disposed in the same layer as that of the source line 10J in the display region AA. As illustrated in FIGS. 3 and 4, in the present embodiment, the first position detection line 41 extends adjacent to the source line 10J. Additionally, the total number of position detection electrodes 14 is less than the total number of pixel electrodes 10G. Specifically, in both the X-axis direction and the Y-axis direction, the arrangement number of position detection electrodes 14 is less than the arrangement number of pixel electrodes 10G (pixel portions PX). As a result, the number of first position detection lines 41 is less than the number of source lines 10J. Thus, as illustrated in FIG. 3, in the present embodiment, one first position detection line 41 is disposed for every three pixel portions PX arranged in the X-axis direction.

Note that, as described above, since the arrangement number of position detection electrodes 14 is less than the arrangement number of pixel electrodes 10G (pixel portions PX), the size of the position detection electrode 14 is larger than the size of the pixel portion PX. For example, while each of the width in the X-axis direction and the width in the Y-axis direction of the pixel portion PX is from several ten μm to a hundred and several tens μm, the position detection electrode 14 has a substantially rectangular shape with one side the size of several mm (for example, approximately from 2 mm to 5 mm). Also, as illustrated in FIG. 4, the position detection electrode 14 (the common electrode 10H) includes an opening 10H2 overlapping at least a portion of the first position detection line 41, and the opening 10H2 reduces the parasitic capacitance that may be generated between a first position detection line 41 and a position detection electrode 14 not connected to the first position detection line 41. Accordingly, the excellent detection sensitivity when detecting the input position is provided.

As illustrated in FIG. 2, in the non-display region NAA, a position detection lead-out line 51 extending from the first position detection line 41 and a source lead-out line 52 extending from the source line 10J are formed. The plurality of positional detection lead-out lines 51 and the plurality of source lead-out lines 52 each converge as closer to the driver 11 such that they are formed in a substantially fan-shaped manner. The position detection lead-out line 51 is provided with a terminal portion 51A connected to the driver 11, and the source lead-out line 52 is provided with a terminal portion 52A connected to the driver 11. In other words, the first position detection line 41 is electrically connected to the terminal portion 51A with the position detection lead-out line 51 interposed therebetween. A test circuit portion 11A configured to allow the first position detection line 41 and the source line 10J to be tested is formed in a mounting region of the driver 11 on the glass substrate 16. The test circuit portion 11A is electrically connected to the terminal portion 11B configured to allow a test signal to be input.

Figure 6:
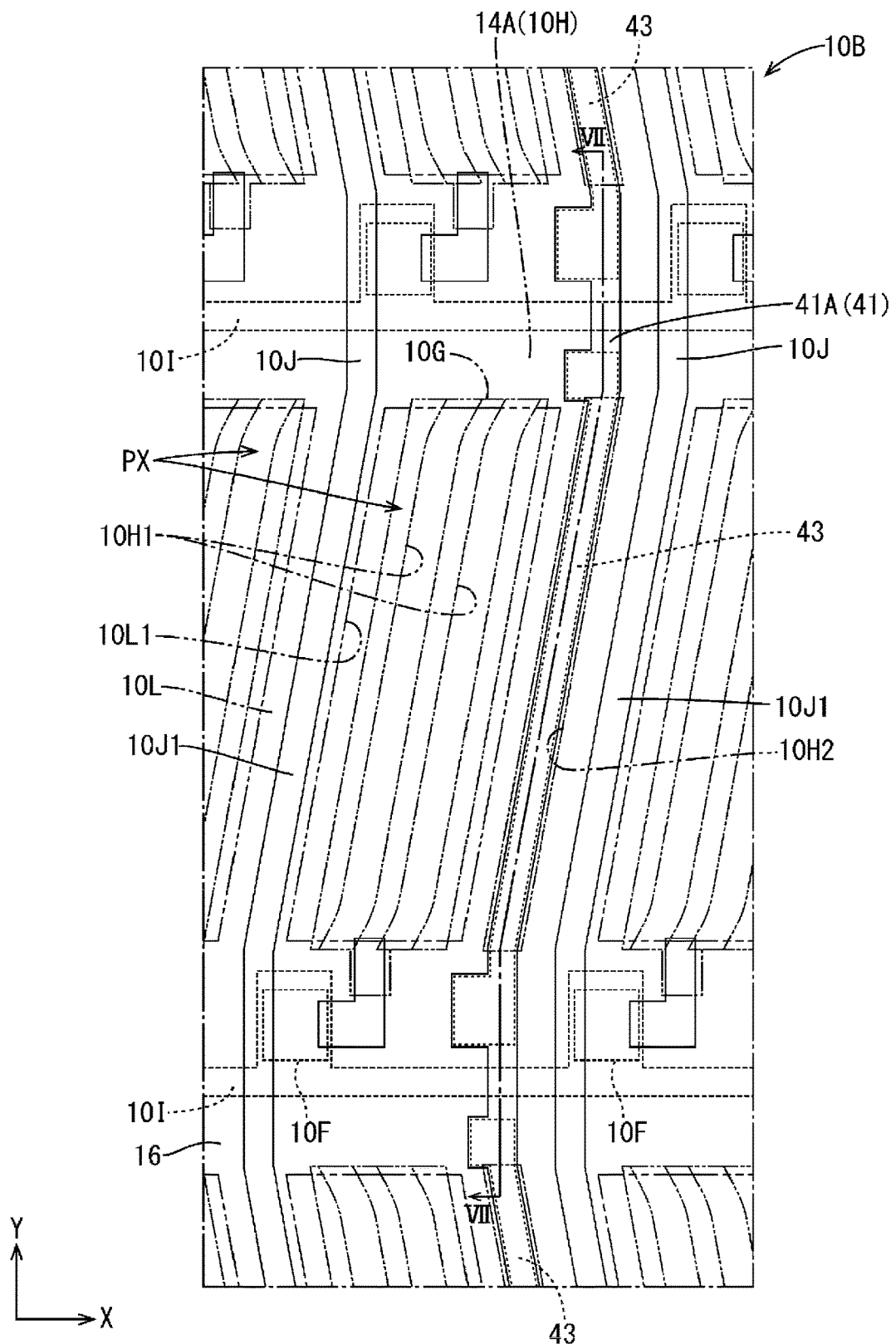
FIG. 6 is a plan view illustrating a pixel disposed at a location where a position detection electrode 14A is disposed.

As illustrated in FIGS. 4 and 6, a second position detection line 42 or a dummy position detection line 43 (a conductive film, see FIG. 6) overlapping the first position detection line 41 is disposed in the display region AA. Next, the configuration of the second position detection line 42 and the dummy position detection line 43 will be described. Note that, in the following description, of the plurality of first position detection lines 41, a first position detection line 41 which is the second line from the left illustrated in FIG. 2 (hereinafter referred to as a first position detection line 41A) is exemplified and described. Further, the position detection electrode 14 connected to the first position detection line 41A is denoted by a reference numeral 14B.

Figure 8:
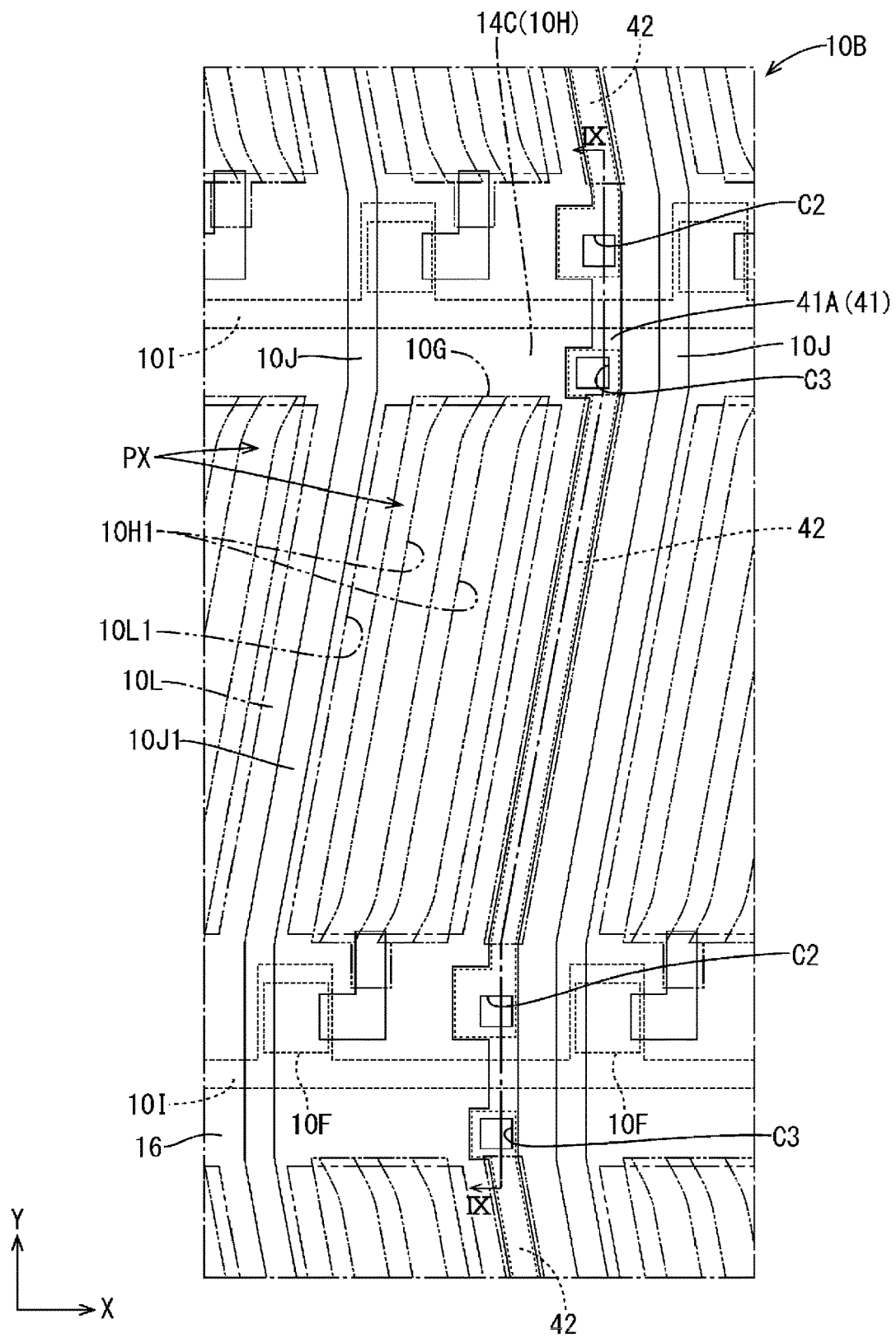
FIG. 8 is a plan view illustrating a pixel disposed at a location where a position detection electrode 14C is disposed.

In addition, in the Y-axis direction, one of the position detection electrodes 14 disposed farther than the position detection electrode 14B from the terminal portion 51A is denoted by a reference numeral 14A, and one of the position detection electrodes 14 disposed closer than the position detection electrode 14B to the terminal portion 51A is denoted by a reference numeral 14C. In other words, each of the position detection electrodes 14A and 14C is a position detection electrode not connected to the first position detection line 41A. FIG. 4 is a plan view illustrating the pixel PX disposed at a location where the position detection electrode 14B is disposed, and FIG. 6 is a plan view illustrating the pixel PX disposed at a location where the position detection electrode 14A is disposed. FIG. 8 is a plan view illustrating the pixel PX disposed at a location where the position detection electrode 14C is disposed.

Figure 5:
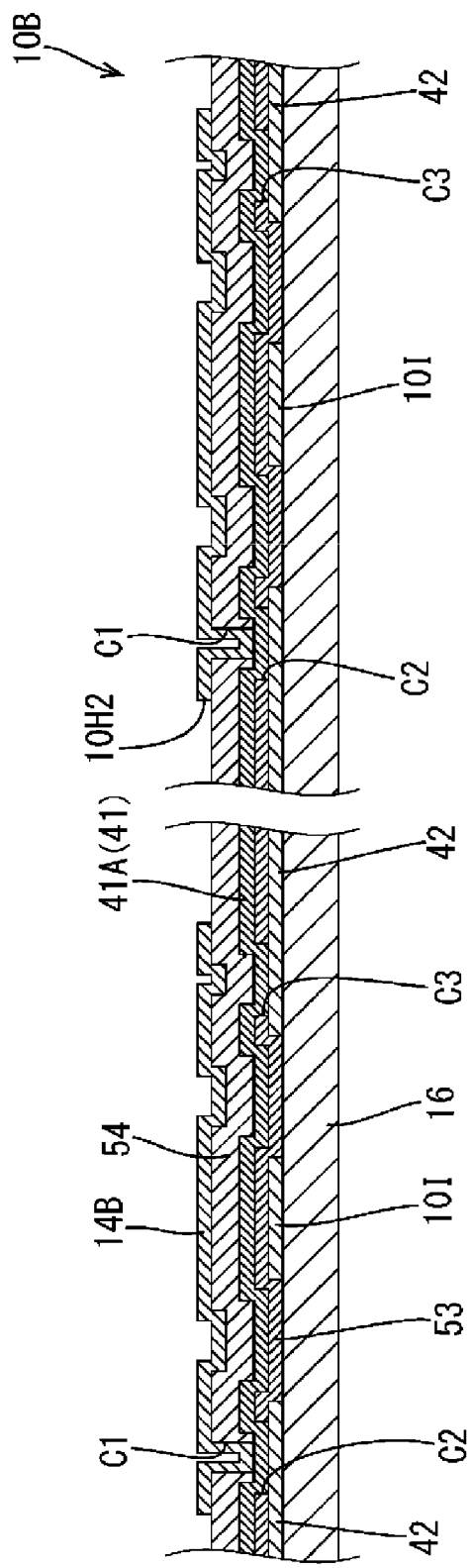
FIG. 5 is a cross-sectional view illustrating an array substrate (corresponding to a view taken along a line V-V in FIG. 4).

As illustrated in FIGS. 4 and 5, at the location where the position detection electrode 14B is disposed, a gate line 10I, a gate insulating film 53, the first position detection line 41, an interlayer insulating film 54 (a first insulating film), and the position detection electrode 14B are layered on the glass substrate 16 in this order with the gate line 10I being the bottom layer. As illustrated in FIG. 5, the second position detection line 42 is disposed in the same layer as that of the gate line 10I and extends in a region where the gate line 10I is not disposed while overlapping the first position detection line 41. The contact hole C1 (a first contact hole) connecting the position detection electrode 14B and the first position detection line 41 is formed in the interlayer insulating film 54 (a first insulating film) interposed between the position detection electrode 14B and the first position detection line 41A.

Further, a contact hole C2 (a second contact hole) and a contact hole C3 connecting the first position detection line 41A and the second position detection line 42 are formed in the gate insulating film 53 (a second insulating film) interposed between the first position detection line 41A and the second position detection line 42. In other words, the second position detection line 42 is electrically connected to the first position detection line 41A at two locations (the contact holes C2 and C3). The contact hole C2 is disposed at a location overlapping the contact hole C1.

Figure 7:
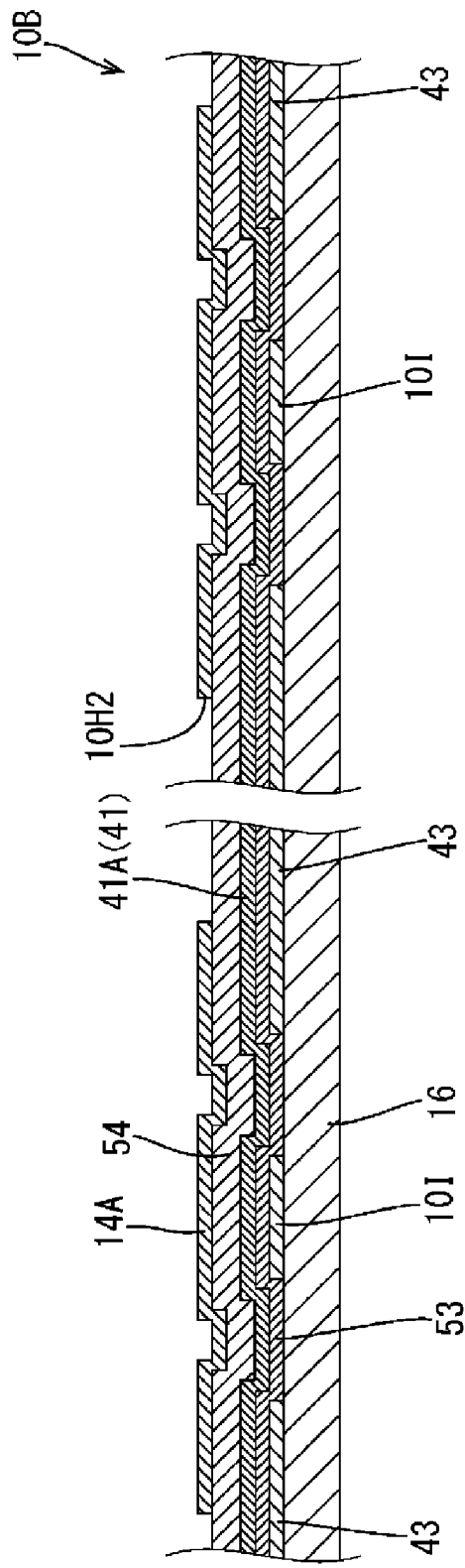
FIG. 7 is a cross-sectional view illustrating an array substrate (corresponding to a view taken along a line VII-VII in FIG. 6).
Figure 9:
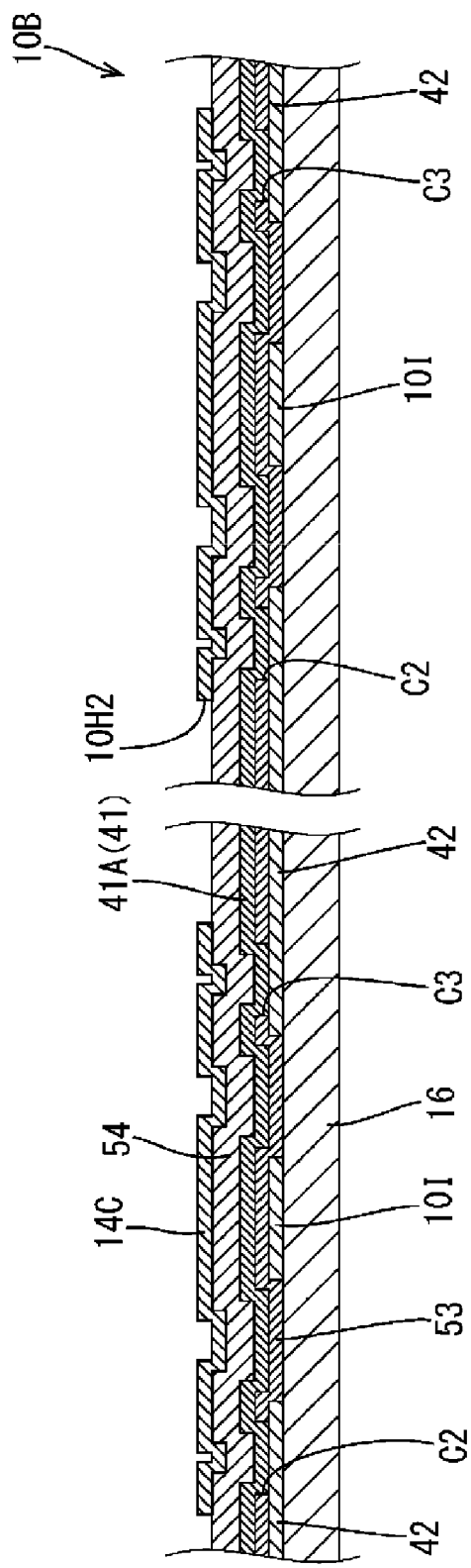
FIG. 9 is a cross-sectional view illustrating an array substrate (corresponding to a view taken along a line IX-IX in FIG. 8).

As illustrated in FIGS. 6 and 7, at the location where the position detection electrode 14A is disposed, the dummy position detection line 43 is disposed in the same layer as that of the gate line 10I and extends in a region where the gate line 10I is not disposed while overlapping the first position detection line 41A. Additionally, as illustrated in FIGS. 8 and 9, at the location where the position detection electrode 14C is disposed, the second position detection line 42 extends overlapping the first position detection line 41A.

As illustrated in FIG. 2, the position detection electrode 14B is connected to the first position detection line 41A at an intermediate portion in the extending direction of the first position detection line 41A. Note that the intermediate portion of the first position detection line 41A is a portion excluding both end portions of the first position detection line 41A. The second position detection line 42 is disposed overlapping a portion A1 (see FIG. 2) of the first position detection line 41A disposed between the connection portion (the contact hole C1) with the position detection electrode 14B and the terminal portion 51A. The dummy position detection line 43 extends overlapping a portion A2 of the first position detection line 41A located opposite to the terminal portion 51A with respect to the connection portion (the contact hole C1) with the position detection electrode 14B. The dummy position detection line 43 is configured not to electrically connect to the first position detection line 41A. Note that a metal material such as Al, Mo, Ti, W, or Cu can be used as a material of the source line 10J, the source lead-out line 52, the first position detection line 41, the second position detection line 42, the dummy position detection line 43, and the position detection lead-out line 51; however, no such limitation is intended.

The following will describe effects of the present embodiment. The first position detection line 41 and the second position detection line 42 are electrically connected at at least two locations, and this can reduce the electrical resistance of the position detection line connected to the position detection electrode 14. The second position detection line 42 is disposed overlapping the first position detection line 41, and this allows an aperture ratio to be secured.

Further, in the present embodiment, the first position detection line 41 extends along the entire length in the Y-axis direction (one side direction) of the display region AA. This configuration can prevent a step due to the thickness of the first position detection line 41 from being formed compared to a configuration in which the first position detection line 41 is partially formed in the Y-axis direction.

Further, in the present embodiment, the second position detection line 42 and the dummy position detecting line 43 are each overlapped with the first position detection line 41. Since the dummy position detection line 43 is provided, the dummy position detection line 43 and the second position detection line 42 are arranged in the Y-axis direction in a lower layer than the first position detection line 41. In a case of a configuration in which only the second position detection line 42 is provided, a step due to the thickness of the second position detection line 42 is formed between the portion where the second position detection line 42 is disposed and the portion where the second position detection line 42 is not disposed. In a case that a step is formed at the location where the first position detection line 41 is formed, the thickness of the liquid crystal layer 10C may be caused to partially vary by the step, and the display quality may deteriorate.

In the present embodiment, the dummy position detection line 43 is provided in the portion where the second position detection line 42 is not disposed, and this can prevent the step from being formed. Note that such a configuration is particularly effective against a configuration not including a flattening film. The dummy position detection line 43 is not electrically connected to the first position detection line 41. This can prevent the dummy position detection line 43 from electrically affecting the first position detection line 41, For example, even in a case where a leak current flows between the dummy position detection line 43 and the gate line 10I, this does not electrically affect the first position detection line 41.

In addition, the width of the line needs to be partially increased at the location where the contact hole is formed, and the aperture ratio decreases according to the width of the line. Since the contact hole C1 (the first contact hole) and the contact hole C2 (the second contact hole) are overlapped with each other, a reduction in the aperture ratio related to the contact hole can be suppressed.

Furthermore, the first position detection line 41 is disposed in the same layer as that of the source line 10J, and the second position detection line 42 is disposed in the same layer as that of the gate line 10I. The source line 10J and the first position detection line 41 can be formed in the same step, and the gate line 10I and the second position detection line 42 can be formed in the same step.

Second Embodiment

Figure 10:
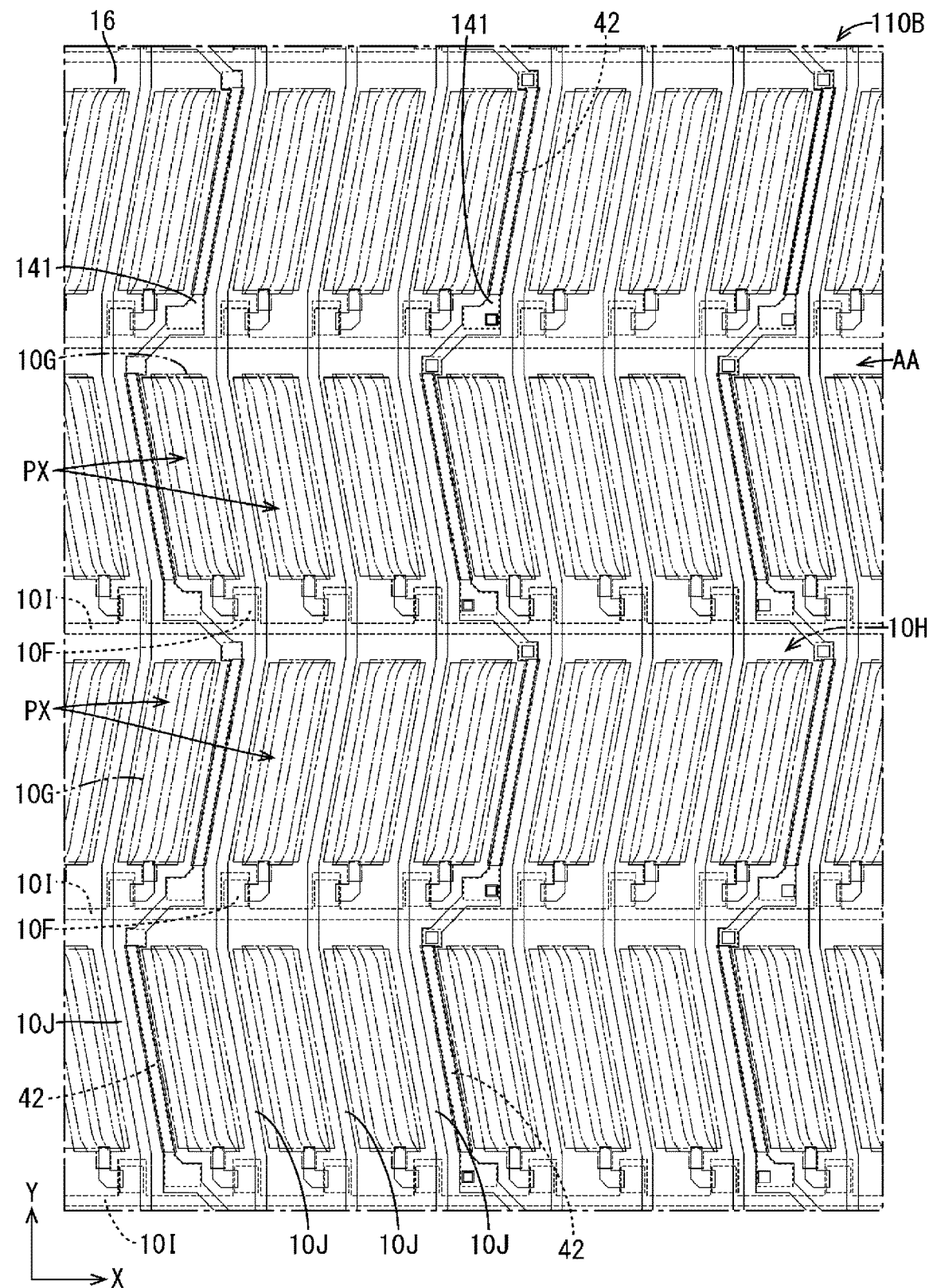
FIG. 10 is a plan view illustrating a pixel arrangement of an array substrate according to a second embodiment.

Next, the second embodiment of the disclosure will be described with reference to FIG. 10. Portions that are the same as those in the above-described embodiment are given the same reference signs, and redundant descriptions thereof will be omitted. As illustrated in FIG. 10, an array substrate 110B of the present embodiment has a Z-inversion pixel structure. In a configuration according to the present embodiment, the TFT 10F and the pixel electrode 10G disposed on the left side (one side in the X-axis direction) in FIG. 10 of a source line 10J extending in the Y-axis direction and the TFT 10F and the pixel electrode 10G disposed on the right side of the source line 10J are alternately arranged in the Y-axis direction. A data signal corresponding to column inversion driving is supplied to the source line 10J. This allows voltage polarities of the adjacent pixels PX in both the X-axis direction and the Y-axis direction to be inverted with each other (this can form the polarity arrangement similar to the pixel arrangement in the dot inversion driving), which can prevent a flicker from occurring and further enhance display quality. Note that the dot inversion driving can be performed in the configuration of the first embodiment (FIG. 3). However, in this case, the amplitude of the signal supplied to the source line 10J in each vertical scanning period is greater than that in a case of the Z-inversion pixel structure, and the power consumption is also increased.

In the present embodiment, the first position detection line 141 is disposed between the pixel electrode 10G and the source line 10J, and thus the first position detection line 141 extends in a zigzag-like manner. In such a configuration, the entire length of the first position detection line 141 increases, and the electrical resistance thereof tends to increase compared to a case that the first position detection line 141 forms a straight line. However, the second position detection line 42 overlapping the first position detection line 141 is provided, which can preferably reduce the electrical resistance of the line.

Third Embodiment

Figure 11:
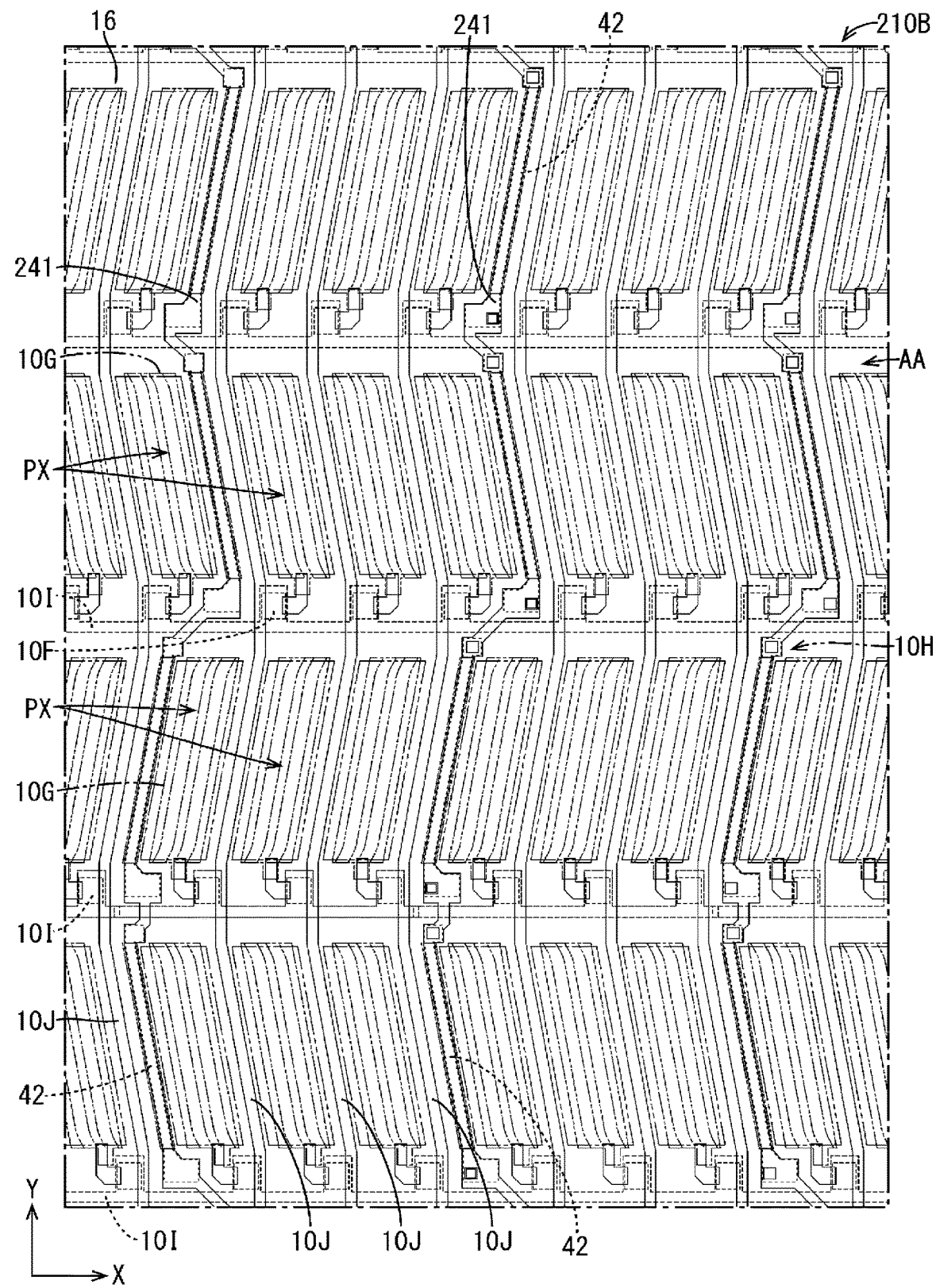
FIG. 11 is a plan view illustrating a pixel arrangement of an array substrate according to a third embodiment.

The third embodiment of the disclosure will be described with reference to FIG. 11. Portions that are the same as those in the above-described embodiment are given the same reference signs, and redundant descriptions thereof will be omitted. In an array substrate 210B of the present embodiment, two sets of the TFT 10F and the pixel electrode 10G, a set of which is disposed on the left side (one side in the X-axis direction) in FIG. 10 of a source line 10J extending in the Y-axis direction, and two sets of the TFT 10F and the pixel electrode 10G, a set of which is disposed on the right side in FIG. 10 of the source line 10J, are alternately arranged in the Y-axis direction. Data signals corresponding to column inversion driving are supplied to adjacent source lines 10J. This allows the voltage polarity to be inverted for every two pixels PX arranged in the Y-axis direction (2H dot inversion driving). In the configuration of the second embodiment, in a case that a checker block pattern is displayed, the amplitude of the signal of the source line 10J configured to supply the signal of one polarity may be greater than the amplitude of the signal of the source line 10J configured to supply the signal of the other polarity. In this case, shadowing and luminance unevenness may be generated on the basis of the parasitic capacitance between the source line 10J and the common electrode 10H. Such a situation can be suppressed in the present embodiment. In the configuration of the present embodiment, a first position detection line 241 is disposed between the pixel electrode 10G and the source line 10J, and thus the first position detection line 241 extends in a zigzag-like manner such that the position of the first position detection line 241 is changed to the right and left for every two rows. In such a configuration, the entire length of the first position detection line 241 increases, and the electrical resistance thereof tends to increase compared to a case that first position detection line 241 forms a straight line. However, the second position detection line 42 overlapping the first position detection line 241 is provided, which can preferably reduce the electrical resistance of the line.

Other Embodiments

The disclosure is not limited to the embodiments described above and illustrated by the drawings, and embodiments such as those described below are also included within the technical scope of the disclosure.

(1) In each of the embodiments described above, a liquid crystal panel is exemplified as a display panel, but the present technology can be applied to other types of display panels.

(2) In the embodiments described above, a case in which the detection type of the touch panel pattern is a self-capacitance type is illustrated; however, the detection type thereof may be a mutual-capacitance type.

(3) The specific planar shape of the pixel electrode, the gate line, the source line, and the TFT is not limited to that illustrated in the above embodiment, and can be changed as appropriate.

(4) In the embodiments described above, a configuration is exemplified in which the gate driver 15 is formed in a monolithic manner on the glass substrate 16; however, the gate driver 15 may be configured as a driver chip and mounted on the glass substrate 16.

(5) The location where the test circuit portion 11A is disposed is not limited to the location illustrated in FIG. 2, and may be disposed near the display region AA, for example.

(6) The shape of the pixel overlapping opening 10H1 formed in the common electrode 10H may be changed as appropriate, and may be a V-shape, for example. Additionally, the number of pixel overlapping openings 10H1 overlapping each pixel electrode 10G need not be two or more and may be at least one.

(7) The first position detection line 41 and the second position detection line 42 may be electrically connected at three or more locations.

(8) In the embodiment described above, a Z-inversion pixel structure is exemplified in which the first position detection line 141 extends in a zigzag-like manner; however, no such limitation is intended.

(9) The first position detection line 41 and the source line 10J are disposed in the same layer, but may not necessarily be formed of the same material. For example, the first position detection line 41 may be formed by layering the material that forms the source line 10J and the material that forms the pixel electrode 10G.

REFERENCE SIGNS LIST

10 Liquid crystal panel (display panel)
10A CF substrate (counter substrate)
10C Liquid crystal layer
10G Pixel electrode
10H Common electrode
10I Gate line
10J Source line
14 Position detection electrode
16 Glass substrate (substrate)
41 First position detection line
42 Second position detection line
43 Dummy position detection line (conductive film)
51A Terminal portion
53 Gate insulating film (second insulating film)
54 Interlayer insulating film (first insulating film)
AA Display region
C1 Contact hole (first contact hole)
C2 Contact hole (second contact hole)
NAA Non-display region

The invention claimed is:

1. A display panel comprising:
a substrate divided into a display region configured to enable an image to be displayed and a non-display region surrounding the display region;
a plurality of pixel electrodes disposed in the display region;
a plurality of position detection electrodes disposed in the display region and configured to detect an input position by a position input body, the plurality of position detection electrodes constituting a common electrode disposed overlapping the plurality of pixel electrodes;

a first position detection line disposed in the display region and connected to a position detection electrode of the plurality of position detection electrodes;

a second position detection line disposed in a layer different from a layer of the first position detection line in the display region and overlapping the first position detection line, the second position detection line being electrically connected to the first position detection line at at least two locations;

a counter substrate facing the substrate with a liquid crystal layer interposed between the counter substrate and the substrate;

a terminal portion disposed in the non-display region and electrically connected to the first position detection line; and a conductive film disposed in a layer identical to a layer of the second position detection line in the display region, wherein the display region has a rectangular shape, the first position detection line extends along the entire length in one side direction of the display region, a position detection electrode of the plurality of position detection electrodes is connected to an intermediate portion in an extending direction of the first position detection line, the second position detection line is disposed overlapping a portion of the first position detection line disposed between a connection portion with the position detection electrode and the terminal portion, and the conductive film extends overlapping a portion of the first position detection line located opposite to the terminal portion with respect to the connection portion with the position detection electrode and is not electrically connected to the first position detection line.

2. A display panel comprising:

a substrate divided into a display region configured to enable an image to be displayed and a non-display region surrounding the display region;

a plurality of pixel electrodes disposed in the display region;

a plurality of position detection electrodes disposed in the display region and configured to detect an input position by a position input body, the plurality of position detection electrodes constituting a common electrode disposed overlapping the plurality of pixel electrodes;

a first position detection line disposed in the display region and connected to a position detection electrode of the plurality of position detection electrodes;

a second position detection line disposed in a layer different from a layer of the first position detection line in the display region and overlapping the first position detection line, the second position detection line being electrically connected to the first position detection line at at least two locations;

a first insulating film interposed between the plurality of position detection electrodes and the first position detection line; and a second insulating film interposed between the first position detection line and the second position detection line, wherein a first contact hole connecting the plurality of position detection electrodes and the first position detection line is formed in the first insulating film, and a second contact hole connecting the first position detection line and the second position detection line is formed in the second insulating film at a location overlapping the first contact hole.

3. A display panel comprising:

a substrate divided into a display region configured to enable an image to be displayed and a non-display region surrounding the display region;

a plurality of pixel electrodes disposed in the display region;

a plurality of position detection electrodes disposed in the display region and configured to detect an input position by a position input body, the plurality of position detection electrodes constituting a common electrode disposed overlapping the plurality of pixel electrodes;

a first position detection line disposed in the display region and connected to a position detection electrode of the plurality of position detection electrodes;

a second position detection line disposed in a layer different from a layer of the first position detection line in the display region and overlapping the first position detection line, the second position detection line being electrically connected to the first position detection line at at least two locations;

a source line disposed in the display region; and a gate line disposed in the display region, wherein the first position detection line is disposed in a layer identical to a layer of the source line, and the second position detection line is disposed in a layer identical to a layer of the gate line.

4. The display panel according to claim 1 further comprising:

a first insulating film interposed between the plurality of position detection electrodes and the first position detection line; and a second insulating film interposed between the first position detection line and the second position detection line, wherein a first contact hole connecting the plurality of position detection electrodes and the first position detection line is formed in the first insulating film, and a second contact hole connecting the first position detection line and the second position detection line is formed in the second insulating film at a location overlapping the first contact hole.

5. The display panel according to claim 1 further comprising:

a source line disposed in the display region; and a gate line disposed in the display region, wherein the first position detection line is disposed in a layer identical to a layer of the source line, and the second position detection line is disposed in a layer identical to a layer of the gate line.

6. The display panel according to claim 1, wherein the first position detection line extends in a zigzag-like manner.

7. The display panel according to claim 2 further comprising:

a source line disposed in the display region; and a gate line disposed in the display region, wherein the first position detection line is disposed in a layer identical to a layer of the source line, and the second position detection line is disposed in a layer identical to a layer of the gate line.

8. The display panel according to claim 2, wherein the first position detection line extends in a zigzag-like manner.

9. The display panel according to claim 3, wherein the first position detection line extends in a zigzag-like manner.

\* \* \* \* \*